Feb. 6, 1940.   B. V. PERERA   2,189,592
PROCESS OF MAKING RELIEF MAPS
Filed March 11, 1937   2 Sheets-Sheet 1
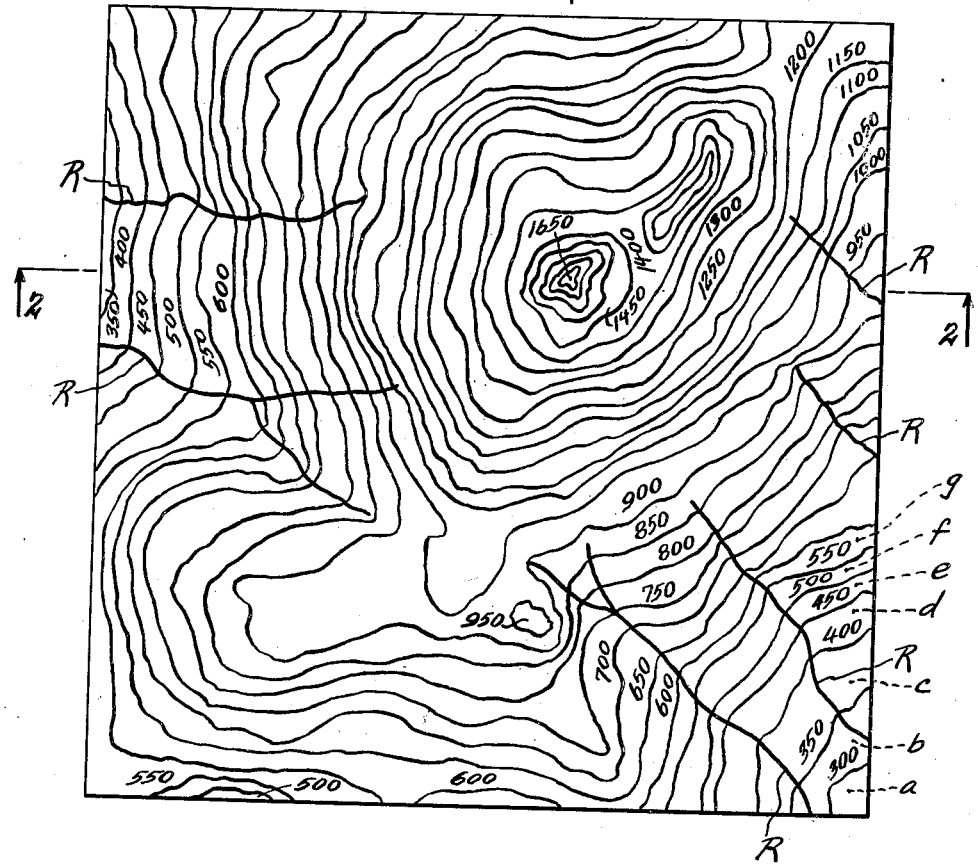
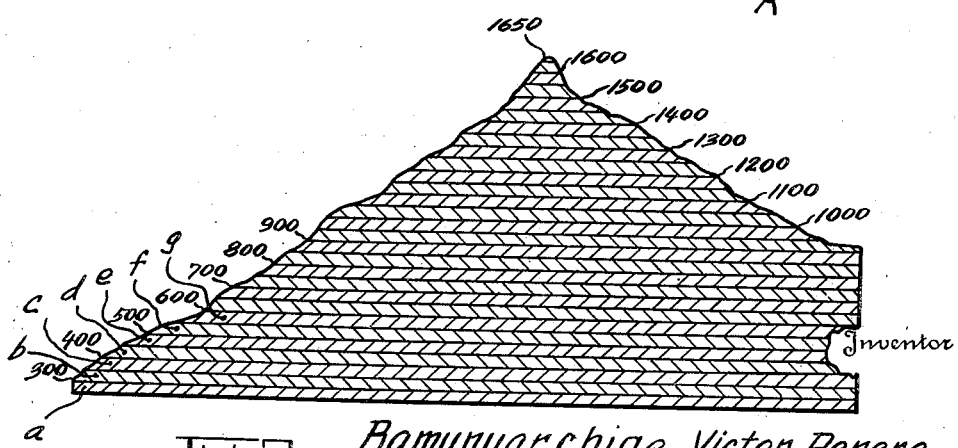
Bamunuarchige Victor Perera
By Carl Miller
Attorney Feb. 6, 1940.  B. V. PERERA  2,189,592
PROCESS OF MAKING RELIEF MAPS
Filed March 11, 1937  2 Sheets-Sheet 2
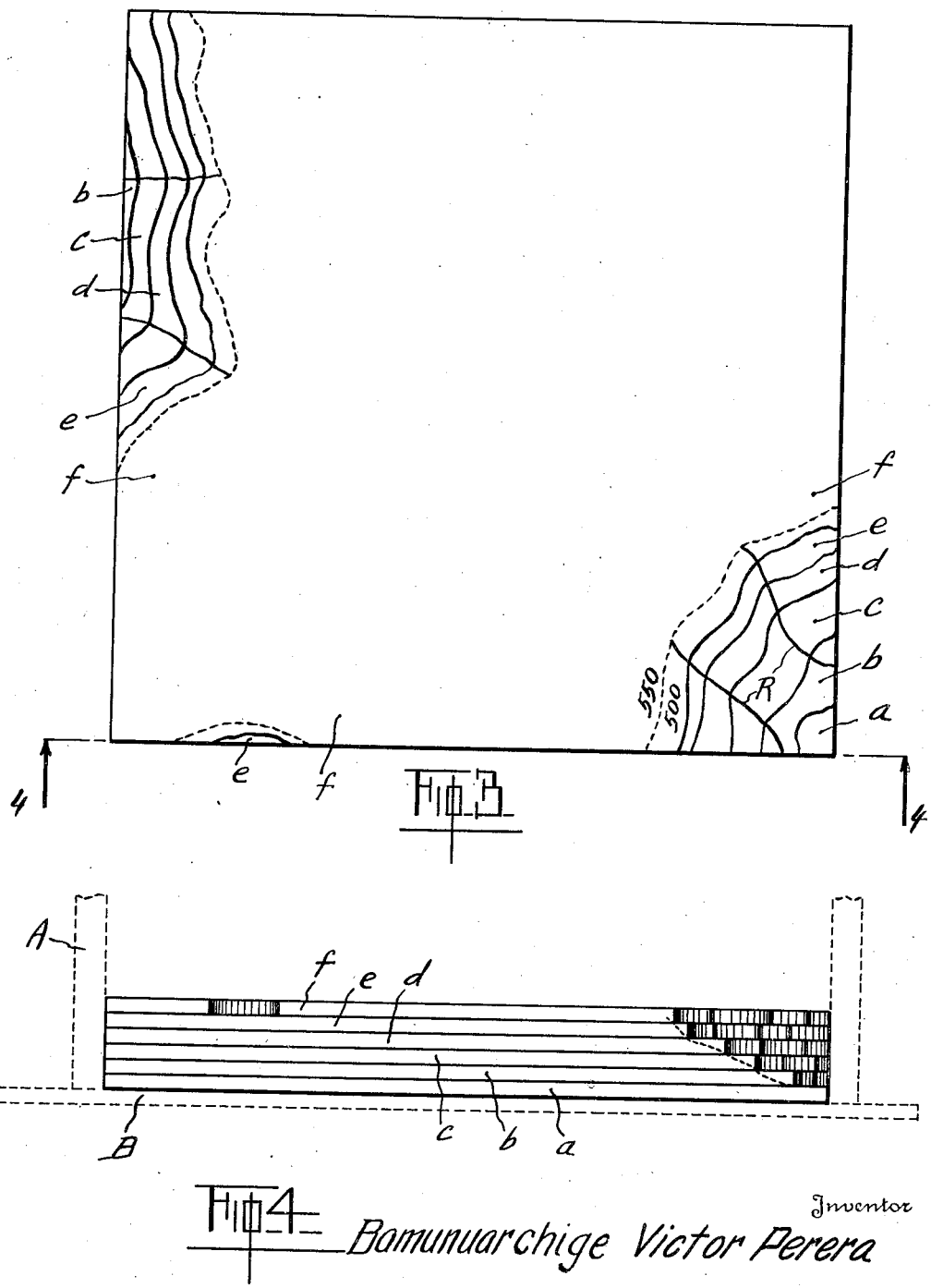
Inventor
*Bamunuarchige Victor Perera*
By *Carl Miller*
Attorney Patented Feb. 6, 1940

2,189,592

UNITED STATES PATENT OFFICE 2,189,592

PROCESS OF MAKING RELIEF MAPS

Bamunuarchige Victor Perera, Ipoh, Perak, Federated Malay States

Application March 11, 1937, Serial No. 130,295

1 Claim. (Cl. 35—41)

This invention relates to process of making relief maps.

The principal object of this invention relates to the construction of a relief map from a given flat contour map which shall have the same degree of accuracy and show all the details furnished on said contour map; by building the relief map of superposed layers of a material such as cardboard, each layer conforming in shape to the outline of a given elevation on said contour map, the number of layers or height of the relief map corresponding to the number of increments in elevation given on the contour map.

Another object of this invention relates to the simplified process of making the relief map which may be followed by any average person to produce a relief map of great accuracy and detail with a minimum of time, effort and expense.

Other objects of this invention relate to making the relief map light, portable and unbreakable; and to permit the construction of large relief maps in sections with the maintenance of the same degree of accuracy and detail.

Referring to the drawings:

Figure 1 shows in plan a relief map which may also be a flat contour map and showing the contour lines and river lines.

Figure 2 is a sectional view of a relief map of the contour shown in Figure 1 taken on line 2—2, thereof.

Figure 3 is a detail plan view illustrating a phase in the formation of the relief map.

Figure 4 is an end elevational view taken on line 4—4, Figure 3.

In order to construct a relief map of a given locality reference must be had to a topographic map upon which are drawn the contour and other natural and artificial features of the terrain represented. This topographic or master map must show the contour lines each designated by its proper elevation or altitude in feet. In Figure 1 there is shown a selected portion of a typical form of topographic map which portion in the shape of a square is defined by ruled lines on the map proper, wherein the lowest contour line is for an elevation of 300 feet and the highest contour line is for an elevation 1650 feet. It will also be noticed that the contour lines are given for increments of 50 feet in elevation. The map also shows the rivers indicated by lines designated R crossing the contour lines.

In making a relief map from the selected square portion of the contour map shown in Figure 1, it is first necessary to decide the scale of the relief map with reference to the scale of the contour map. In the contour map of Figure 1, the scale is that of six inches to a mile, and the area covered by the contour map is one square mile. While the relief map may be made in any desired scale the simplest is to make the same of the same scale as that of the contour map. Obviously the selected portion of the contour map may be defined by ruled lines thereon to produce any desired shape, polygonal or otherwise. Again referring to Figure 1, it will be noted that the extent in elevation from the 300 to the 1650 foot levels comprises twenty-nine 50 foot increments. There will thus be required twenty-nine plus one base layer, or thirty layers to construct the relief map. These layers must be flat, of any suitable material such as card-board, fibre, rubber compound, etc., and of like and uniform thickness, and each six inches square. Preferably the layers should be $\frac{3}{32}$ inch or $\frac{1}{8}$ inch in thickness.

To maintain the assembly of the layers to be hereinafter described, there is provided a square frame A, shown in dotted lines in Figure 4, provided with a removable bottom B and in which the sides of the frame are preferably made separable to facilitate removal of the completed model.

With the frame A assembled the base layer A is placed on the bottom B for the placement thereon of the superposed contour layers. Each contour layer is made in the following manner: Starting first with the lowest contour, a tracing is made of both the 300 foot contour and the 350 foot contour, this tracing being then transferred to a layer with the 300 foot contour in a solid line and the 350 foot contour in a dotted line, the layer being then accurately cut along the 300 foot contour line. This layer indicated by $b$ is then glued or bonded to the base layer $a$ in its proper position relative thereto. The next contour line tracing is made on the 350 foot contour line and the 400 foot contour line is traced in a dotted line. This second tracing when transferred to another layer which layer when cut along the solid line constitutes the layer $c$ is similarly secured to the layer $b$, the position thereof being determined by the dotted 350 foot contour line on the layer $b$. It is to be understood that at the same time there are traced and transferred to the layers $b$ and $c$, all river lines that flow between the contour lines.

In a like manner as described above the layers $d$, $e$ and $f$ are patterned to conform with the respective 400, 450 and 500 foot contour lines.

Figure 3 shows in plan, superposed layers $a$, b, c, d, e and f with layer f uppermost, and showing the same, cut on the 500 foot contour line and also showing the dotted 550 foot contour line for locating the layer g to be placed thereabove, see Figures 1 and 2. The remaining layers are similarly patterned and are glued or bonded to each other to form a unitary solid model or relief map. The edges or corners of the layers are to be cut or smoothed down to the dotted line shape, see Figure 4 in any suitable manner to assume the undulating or rough outline shown in the section, Figure 2 in accordance with the topographic details of the terrain shown. The river lines R as traced on the layers are initially deeply grooved or impressed with a suitable tool so as not to be obliterated by the smoothing down of the edges and corners of the layers whereby to clearly show up in the finished model.

All other details such as contour line values, towns, names of towns, forests, lakes, roads, transmission lines, etc., may then be suitably depicted in their proper relationship on the completed relief map which also may be suitably painted in colors and varnished.

It is obvious that a large relief map of any size and scale may be made in sections, as above described, and readily assembled and disassembled. These relief maps by virtue of their durable construction, ease of handling, great accuracy and detail, provide in a simple and efficient manner a use thereof of immense value to war offices, engineering firms, survey offices, technical schools, planters, miners and others who are in any way concerned with this subject.

While the method of procedure has been described in its simplest and preferred forms, it is susceptible of various other modifications within the scope of the invention.

Having thus set forth and disclosed the nature of this invention, what is claimed is:

The method of making relief maps, which consists in, first, tracing on a transfer sheet the outline of a contour line on a given contour map within a selected portion thereof as defined by a ruled polygon thereon starting with the lowest elevation within said portion and at the same time on the same transfer sheet tracing the next highest contour lines; second, transferring on a substantially stiff layer of suitable material of the same shape and size as defined by said polygonal portion said contour lines, the contour line of one elevation being made solid and the line representing the next highest elevation dotted; third, cutting said layer along said solid contour line; fourth, attaching as by glueing or bonding said layer to a rigid base layer equal in shape and size to said polygonal portion; fifth, repeating the transfer of each subsequently higher contour line by the same method as indicated to a like shaped layer and cutting the outline thereof thereon and superposing the same on each other in corresponding relationship to the contour lines on the contour map, the dotted lines on a lower layer serving to properly indicate the position of the layer superposed thereon; sixth, assembling said layers and uniting them together and to said base layer within an assembly frame fitted to said base layer surrounding the sides thereof; seventh, removing said frame; eighth, smoothing and rounding the edges of the superposed layers to produce an irregular surface corresponding to the topography of the terrain to be indicated; and, ninth, applying a protective and decorative covering to said surface.

BAMUNUARCHIGE VICTOR PERERA.